US009065714B2

(12) United States Patent
Malladi et al.

(10) Patent No.: US 9,065,714 B2
(45) Date of Patent: Jun. 23, 2015

(54) TRANSMISSION OF INFORMATION USING CYCLICALLY SHIFTED SEQUENCES

(75) Inventors: Durga Prasad Malladi, San Diego, CA (US); Byoung-Hoon Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1009 days.

(21) Appl. No.: 11/971,872

(22) Filed: Jan. 9, 2008

(65) Prior Publication Data

US 2008/0165893 A1 Jul. 10, 2008

Related U.S. Application Data

(60) Provisional application No. 60/884,403, filed on Jan. 10, 2007.

(51) Int. Cl.
*H04J 13/00* (2011.01)
*H04L 27/26* (2006.01)
(Continued)

(52) U.S. Cl.
CPC ....... *H04L 27/2613* (2013.01); *H04W 72/0406* (2013.01); *H04J 13/0074* (2013.01);
(Continued)

(58) Field of Classification Search
CPC . H04L 27/2613; H04L 1/0003; H04L 1/0009; H04L 1/0026; H04L 1/0072; H04L 1/1607; H04L 1/1671; H04L 5/023; H04L 13/10; H04J 13/0074; H04W 72/0406
USPC ................. 375/130, 132, 259–260, 295, 316; 370/203, 206, 208
See application file for complete search history.

(56) References Cited

U.S. PATENT DOCUMENTS 5,309,474 A    5/1994   Gilhousen et al.
5,784,100 A *  7/1998   Konishi ........................ 348/251
(Continued)

FOREIGN PATENT DOCUMENTS

CN    1262824 A    8/2000
EP    0684744 A2   11/1995
(Continued)

OTHER PUBLICATIONS

ETRI "Cyclic-shift hopping for uplink sounding reference signal," 3GPP TSG RAN WG1 Meeting #47-BIS, vol. R1-070213. Jan. 15-19, 2007, XP002482750.
(Continued)

*Primary Examiner* — Jean B Corrielus
(74) *Attorney, Agent, or Firm* — Peng Zhu

(57) ABSTRACT

Techniques for transmitting information using cyclically shifted sequences are described. In one design, first and second sequences may be generated by cyclically shifting a base sequence by first and second amounts, respectively. The base sequence may be a CAZAC sequence, a PN sequence, or some other sequence having good correlation properties. The cyclic shifts for the first and second sequences may be determined based on a hopping pattern. A first modulated sequence may be generated based on the first sequence and a first modulation symbol and may be sent in a first time interval. A second modulated sequence may be generated based on the second sequence and a second modulation symbol and may be sent in a second time interval. Each modulated sequence may be sent on K consecutive subcarriers using localized frequency division multiplexing (LFDM).

47 Claims, 12 Drawing Sheets

(51) Int. Cl.
- *H04W 72/04* (2009.01)
- *H04J 13/10* (2011.01)
- *H04L 1/00* (2006.01)
- *H04L 1/16* (2006.01)
- *H04L 5/02* (2006.01)

(52) U.S. Cl.
CPC .............. *H04J 13/10* (2013.01); *H04L 1/0003* (2013.01); *H04L 1/0009* (2013.01); *H04L 1/0026* (2013.01); *H04L 1/0072* (2013.01); *H04L 1/1607* (2013.01); *H04L 1/1671* (2013.01); *H04L 5/023* (2013.01)

(56) References Cited

U.S. PATENT DOCUMENTS

| | | | |
|---|---|---|---|
| 6,542,478 B1 * | 4/2003 | Park | 370/308 |
| 6,816,474 B2 | 11/2004 | Kang et al. | |
| 7,848,438 B2 * | 12/2010 | Baum et al. | 375/260 |
| 8,681,766 B2 * | 3/2014 | Zhang et al. | 370/345 |
| 2001/0019576 A1 | 9/2001 | Nystrom et al. | |
| 2002/0118635 A1 * | 8/2002 | Nee | 370/210 |
| 2005/0068963 A1 | 3/2005 | Lee et al. | |
| 2005/0201295 A1 | 9/2005 | Kim et al. | |
| 2006/0050799 A1 * | 3/2006 | Hou et al. | 375/260 |
| 2006/0056360 A1 * | 3/2006 | Parkvall et al. | 370/335 |
| 2007/0171995 A1 * | 7/2007 | Muharemovic et al. | 375/260 |
| 2007/0270273 A1 * | 11/2007 | Fukuta et al. | 475/206 |
| 2008/0101440 A1 * | 5/2008 | Lee | 375/141 |
| 2011/0096657 A1 * | 4/2011 | Luo et al. | 370/203 |
| 2012/0218957 A1 * | 8/2012 | Lee | 370/329 |

FOREIGN PATENT DOCUMENTS

| | | |
|---|---|---|
| JP | 2003348648 | 12/2003 |
| JP | 2005130491 A | 5/2005 |
| JP | 2006339924 A | 12/2006 |
| RU | 2196392 C2 | 1/2003 |
| WO | WO9949594 A1 | 9/1999 |
| WO | WO2005039094 | 4/2005 |
| WO | WO-2006015108 A2 | 2/2006 |
| WO | WO-2006031239 A1 | 3/2006 |
| WO | 2008026898 | 3/2008 |

OTHER PUBLICATIONS

Miller, S.: "An Efficient Channel Coding Scheme for Direct Sequence CDMA Systems," Military. Communications in a Changing World. Mclean, VA., Nov. 4-7, 1991, [Proceedings of the Military Communications Conference. (Milcom)], New York, IEEE, US, vol. 4 Nov. 1991, pp. 1249-1253, XP010042343, ISBN 978-0-87942-691-0.

NTT DoCoMo, NEC, Sharp: "Orthogonal Pilot Channel Structure in E-UTRA Uplink." 3GPP TSG-RAN WG1 LTE AD HOC Meeting, vol. R1-060046. Sep. 23-25, 2006, pp. 1-8, XP002482751.

Unal, B. et al.: "Code-hopping as a new strategy to improve performance of S-CDMA cellular systems," Global Telecommunications Conference, 1996. Globecom '96. Communications: The Key to Global Prosperity. London, UK Nov. 18-22, 1996, New York, NY USA IEEE, US vol. 2 Nov. 18, 1996 pp. 1316-1319, XP010220131 ISBN 978-0-7803-3336-9.

International Search Report—PCT/US2008/050779, International Search Authority, European Patent Office—Jun. 17, 2008.

Written Opinion—PCT/US2008/050779, International Search Authority, European Patent Office—Jun. 17, 2008.

Taiwan Search Report—TW097101027—TIPO—Jan. 19, 2012.

* cited by examiner

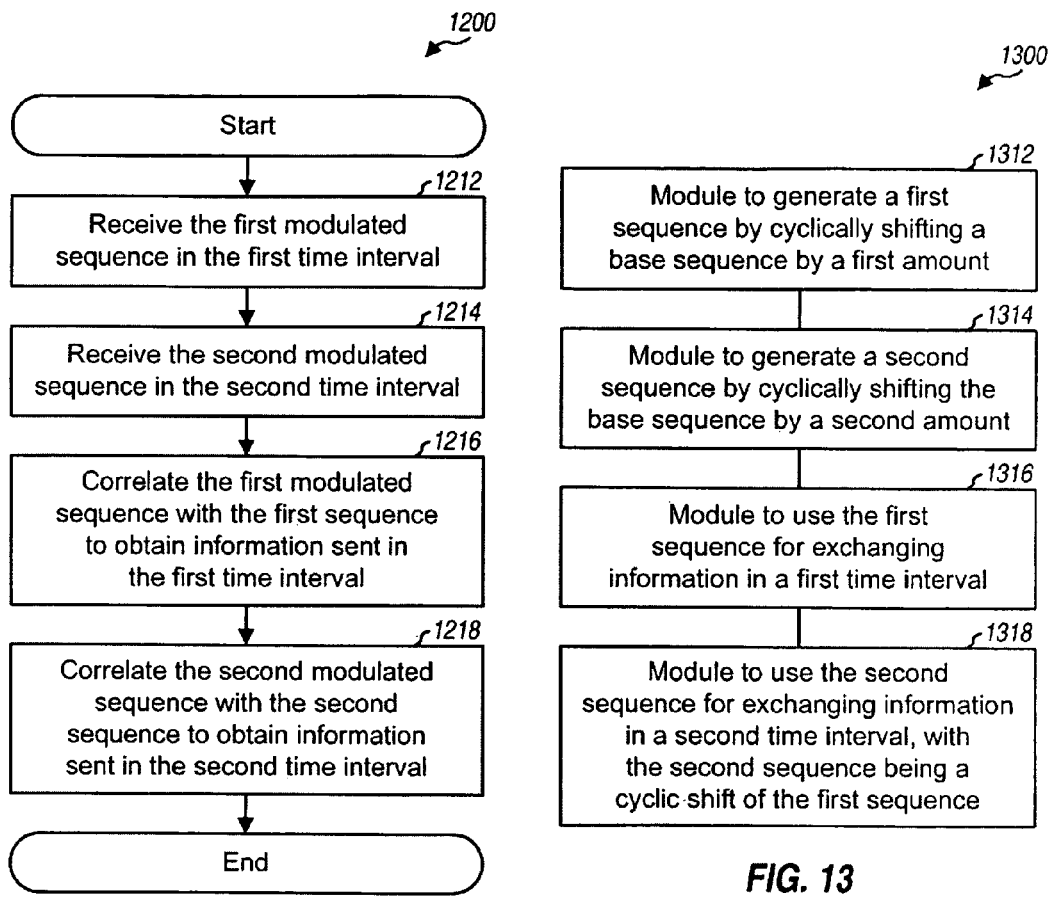

TRANSMISSION OF INFORMATION USING CYCLICALLY SHIFTED SEQUENCES

The present application claims priority to provisional U.S. Application Ser. No. 60/884,403, entitled "A METHOD AND APPARATUS FOR ACK HOPPING FOR INTERFERENCE RANDOMIZATION IN UL SINGLE CARRIER FDTMA," filed Jan. 10, 2007, assigned to the assignee hereof and incorporated herein by reference.

BACKGROUND

I. Field

The present disclosure relates generally to communication, and more specifically to techniques for transmitting information in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, a base station may transmit data to one or more user equipments (UEs) on the downlink and may receive control information from the UEs on the uplink. The downlink (or forward link) refers to the communication link from the base station to the UEs, and the uplink (or reverse link) refers to the communication link from the UEs to the base station. It is desirable to transmit the control information as efficiently as possible in order to improve system performance.

SUMMARY

Techniques for transmitting information using cyclically shifted sequences are described herein. The cyclically shifted sequences may be obtained by cyclically shifting a base sequence by different amounts. The base sequence may be a CAZAC (constant amplitude zero auto correlation) sequence, a pseudo-random number (PN) sequence, or some other sequence having good correlation properties. Information may be modulated on the cyclically shifted sequences and sent using a modulation technique such as localized frequency division multiplexing (LFDM).

In one design, a first sequence may be generated by cyclically shifting the base sequence by a first amount, and a second sequence may be generated by cyclically shifting the base sequence by a second amount. The cyclic shifts for the first and second sequences may be determined based on a hopping pattern that indicates the amount of cyclic shift in each time interval. The hopping pattern may be determined based on resources assigned for data transmission and may be specific to a cell. The first sequence may be used for exchanging (e.g., sending or receiving) information in a first time interval. The second sequence may be used for exchanging information in a second time interval. The first and second time intervals may correspond to different symbol periods, different slots, different subframes, etc.

In one design for sending information, a first modulated sequence may be generated based on the first sequence and a first modulation symbol. A second modulated sequence may be generated based on the second sequence and a second modulation symbol. The first and second modulated sequences may be sent in the first and second time intervals, respectively. Each modulated sequence may include K symbols and may be sent on K consecutive subcarriers, e.g., using LFDM.

In one design for receiving information, the first and second modulated sequences may be received in the first and second time intervals, respectively. The first modulated sequence may be correlated with the first sequence to obtain information sent in the first time interval. The second modulated sequence may be correlated with the second sequence to obtain information sent in the second time interval.

Various aspects and features of the disclosure are described in further detail below.

BRIEF DESCRIPTION OF THE DRAWINGS

FIG. 12 shows a process for receiving information.

FIG. 13 shows an apparatus for exchanging information.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA, E-UTRA and GSM are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, CSM, UMTS and LTE are described in documents from an organization named "3rd Generation Partnership Project" (3GPP). cdma2000 and UMB are described in documents from an organization named "3rd Generation Partnership Project 2" (3GPP2). These various radio technologies and standards are known in the art. For clarity, certain aspects of the techniques are described below for LTE, and LTE terminology is used in much of the description below.

Figure 1:
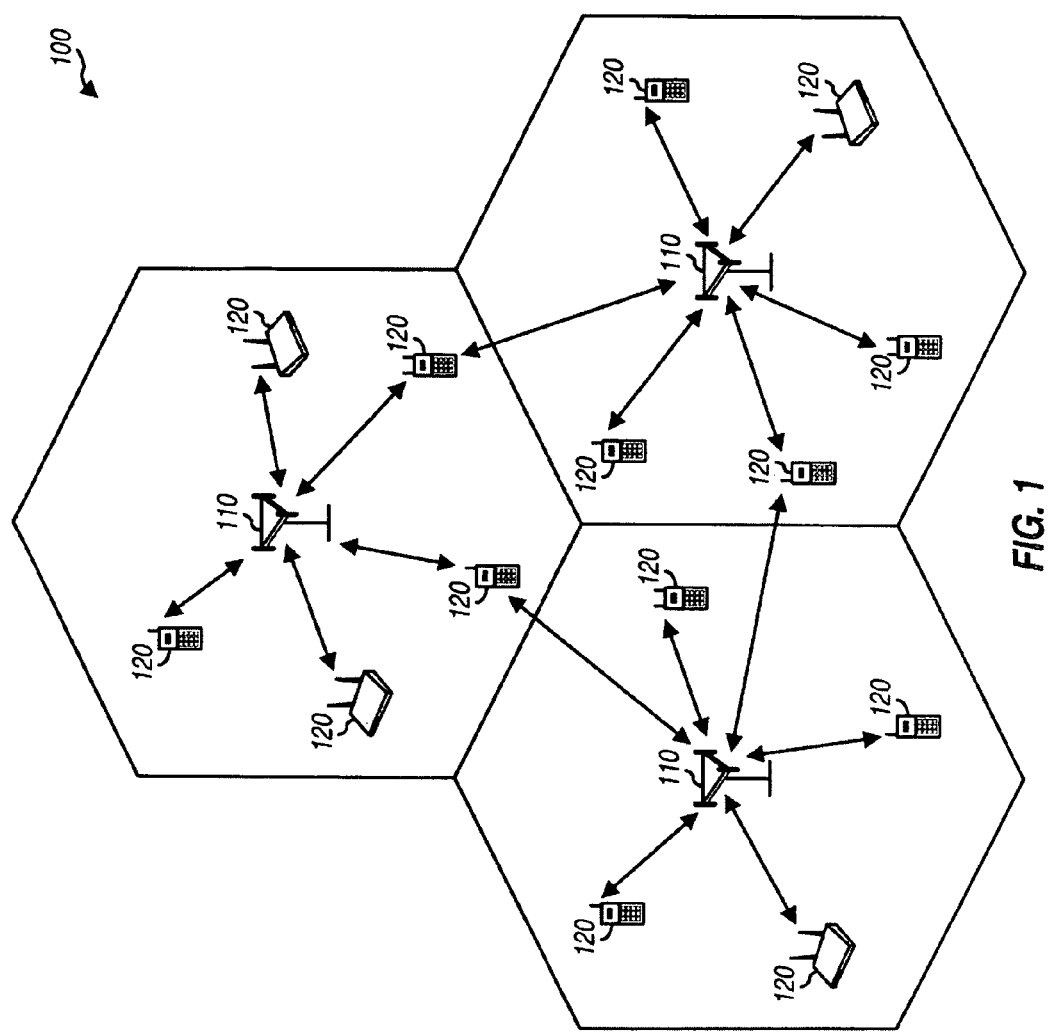
FIG. 1 shows a wireless multiple-access communication system.

FIG. 1 shows a wireless multiple-access communication system 100 with multiple evolved Node Bs (eNBs) 110. An eNB may be a fixed station that communicates with the UEs and may also be referred to as a Node B, a base station, an access point, etc. Each eNB 110 provides communication coverage for a particular geographic area. The term "cell" can refer to the smallest coverage area of an eNB and/or an eNB subsystem serving this coverage area. UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with an eNB via transmissions on the downlink and uplink. The terms "UE" and "user" are used interchangeably herein.

The system may support hybrid automatic retransmission (HARQ). For HARQ on the downlink, an eNB may send a transmission for a packet and may send one or more retransmissions until the packet is decoded correctly by a recipient UE, or the maximum number of retransmissions has been sent, or some other termination condition is encountered. A packet may also be referred to as a transport block, a codeword, etc. HARQ may improve reliability of data transmission.

Figure 2:
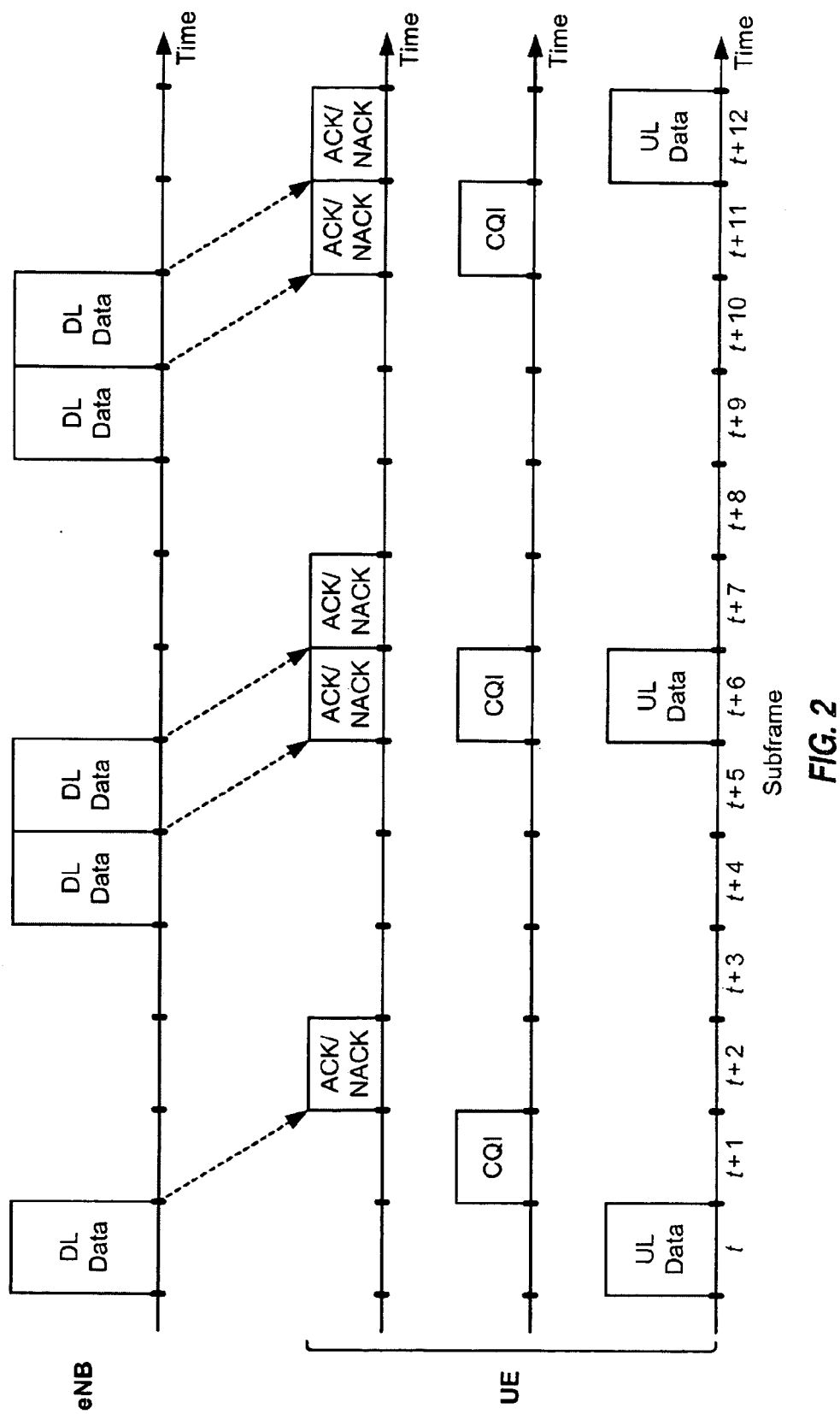
FIG. 2 shows transmissions on the downlink and uplink.

FIG. 2 shows downlink (DL) transmission by an eNB and uplink (UL) transmission by a UE. The UE may periodically estimate the downlink channel quality for the eNB and may send channel quality indicator (CQI) to the eNB. The eNB may use the CQI and/or other information to select the UE for data transmission on the downlink and to select a suitable rate (e.g., a modulation and coding scheme) for the data transmission to the UE. The eNB may process and transmit data to the UE when there is data to send and system resources are available. The UE may process a downlink data transmission from the eNB and may send an acknowledgement (ACK) if the data is decoded correctly or a negative acknowledgement (NACK) if the data is decoded in error. The eNB may retransmit the data if a NACK is received and may transmit new data if an ACK is received. The UE may also transmit data on the uplink to the eNB when there is data to send and the UE is assigned uplink resources.

In the following description, the terms "ACK" and "ACK information" generically refer to ACK and/or NACK. As shown in FIG. 2, the UE may transmit data and/or control information, or neither, in any given subframe. The control information may comprise ACK, CQI, etc. The type and amount of control information to send may be dependent on various factors such as whether MIMO is used for transmission, the number of packets to send, etc. For simplicity, much of the following description focuses on ACK and CQI.

LTE utilizes orthogonal frequency division multiplexing (OFDM) on the downlink and single-carrier frequency division multiplexing (SC-FDM) on the uplink. OFDM and SC-FDM partition the system bandwidth into multiple (N) orthogonal subcarriers, which are also commonly referred to as tones, bins, etc. Each subcarrier may be modulated with data. In general, modulation symbols are sent in the frequency domain with OFDM and in the time domain with SC-FDM. In LTE, the spacing between adjacent subcarriers may be fixed, and the total number of subcarriers (N) may be dependent on the system bandwidth. For example, N may be equal to 128, 256, 512, 1024 or 2048 for system bandwidth of 1.25, 2.5, 5, 10 or 20 MHz, respectively.

Figure 3:
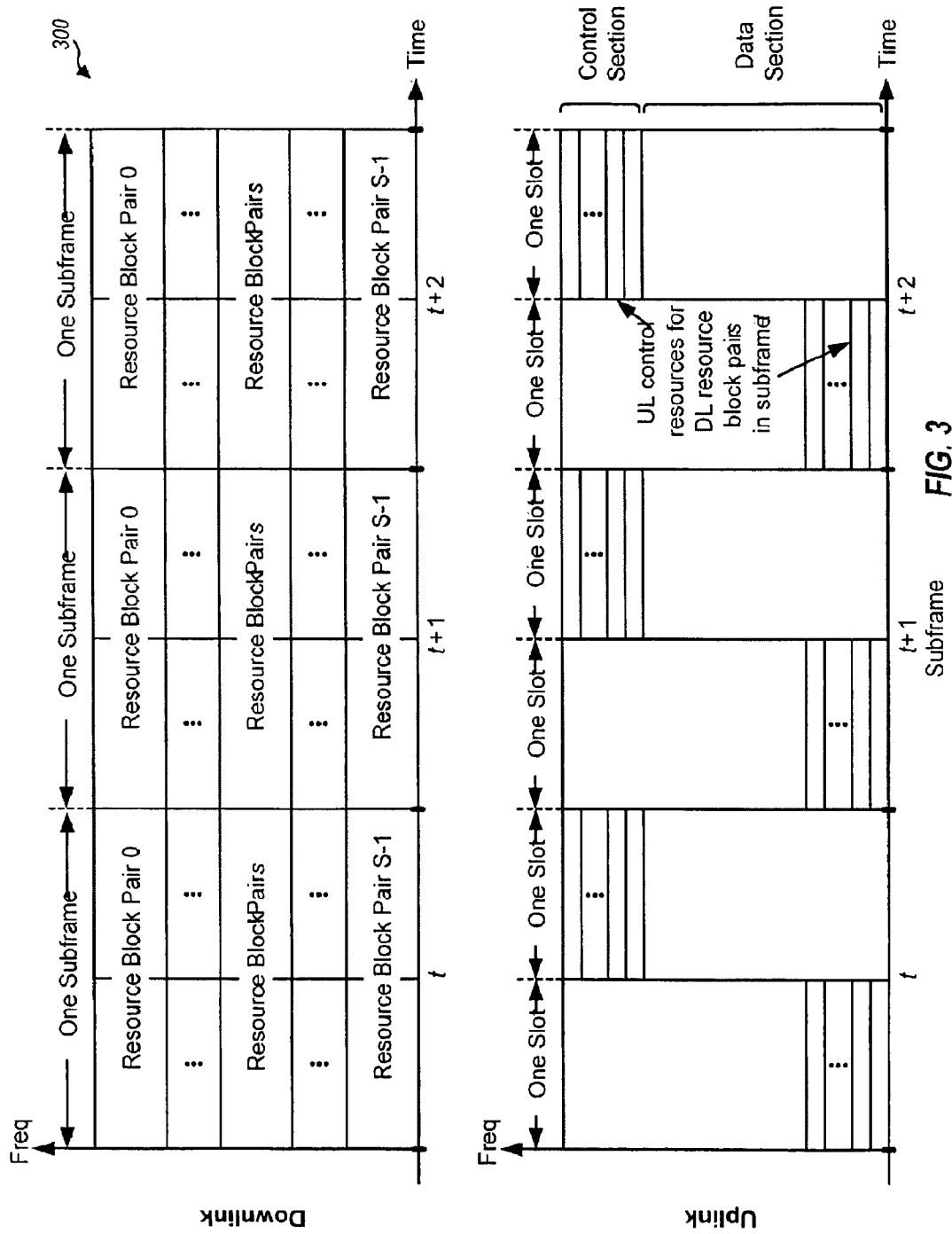
FIG. 3 shows a transmission structure for the downlink and uplink.

FIG. 3 shows a design of a transmission structure 300 that may be used for the downlink and uplink. The transmission timeline may be partitioned into subframes. A subframe may have a fixed duration, e.g., one millisecond (ms), and may be partitioned into two slots. Each slot may cover a fixed or configurable number of symbol periods.

For the downlink, S resource blocks may be available in each slot, where S may be dependent on the system bandwidth. Each resource block may comprise V subcarriers (e.g., V=12 subcarriers) in one slot. The available resource blocks may be assigned to UEs for downlink transmission. In one design, a UE may be assigned one or more pairs of resource blocks in a given subframe. Each resource block pair comprises V subcarriers in two slots of one subframe.

For the uplink, the N total subcarriers may be divided into a data section and a control section. In one design, the control section may be formed at an edge of the system bandwidth, as shown in FIG. 3. The control section may have a configurable size, which may be selected based on the amount of control information to send on the uplink by the UEs. The data section may include all subcarriers not included in the control section. The design in FIG. 3 results in the data section including contiguous subcarriers, which may allow a single UE to be assigned all of the contiguous subcarriers in the data section.

In one design, each resource block pair on the downlink is associated with a corresponding resource block pair in the control section on the uplink, as shown in FIG. 3. The size of the uplink resource block pair may or may not match the size of downlink resource block pair. In one design, the uplink resource block pair includes V consecutive subcarriers in each slot of a subframe. For data sent on downlink resource block pair s in subframe t, ACK for the data and/or other information may be sent on the associated uplink resource block pair. Multiple downlink resource block pairs may be mapped to the same uplink resource block pair, as described below.

In an aspect, control information may be sent using sequences that are cyclically shifted by different amounts, which may be determined based on a hopping pattern. These sequences may be obtained by cyclically shifting a base sequence having good correlation properties. Various types of sequence may be used for the base sequence. In one design, a PN sequence may be used for the base sequence. In another design, a CAZAC sequence may be used for the base sequence. Some example CAZAC sequences include a Frank sequence, a Chu sequence, a Zardoff-Chu sequence, a generalized chirp-like (GCL) sequence, etc. A CAZAC sequence can provide zero auto-correlation, which is a large value for the correlation of the CAZAC sequence with itself at zero offset and zero values for all other offsets. The zero auto-correlation property is beneficial for accurate detection of the CAZAC sequence.

In one design, a Zardoff-Chu sequence may be used for the base sequence and may be expressed as:

$$x_\lambda(k) = e^{-j\pi\lambda k^2/K}, \text{ for } k=0, \ldots, K-1, \qquad \text{Eq (1)}$$

where k is a sample index for the sequence,
K is the length of the sequence,
$\lambda \in \{0, \ldots, K-1\}$ is a base sequence parameter, and
$x_\lambda(k)$ is a Zardoff-Chu sequence for parameter $\lambda$.

The base sequence parameter $\lambda$ may be selected such that it is mutually prime with the sequence length K, which may be denoted as $(\lambda, K)=1$. Different base sequences may be defined with different values of $\lambda$. For example, if K=12, then $\lambda$ may be equal to 1, 5, 7 or 11, and four base sequences may be defined with these four values of $\lambda$. The base sequences have zero cross-correlation, so that the correlation of a given base sequence with any other base sequence is zero (ideally) for all offsets.

In one design, one base sequence may be assigned to each cell, and neighboring cells may be assigned different base sequences. For clarity, much of the following description is for one cell, and the base sequence for this cell may be denoted as x(k). In one design, the base sequence for the cell may be a Zardoff-Chu sequence, so that $x(k)=x_\lambda(k)$. In other designs, the base sequence for the cell may be other types of sequence.

The base sequence x(k) may be cyclically shifted as follows:

$$x(k,a)=x((k+a) \bmod K), \text{ for } k=0, \ldots, K-1, \quad \text{Eq (2)}$$

where a is the amount of cyclic shift,
x(k, a) is a cyclically shifted sequence, and
"mod" denotes a modulo operation.
The cyclic shift a may be any value within a range of 0 to K−1, or 0≤a≤K−1.

Figure 4:
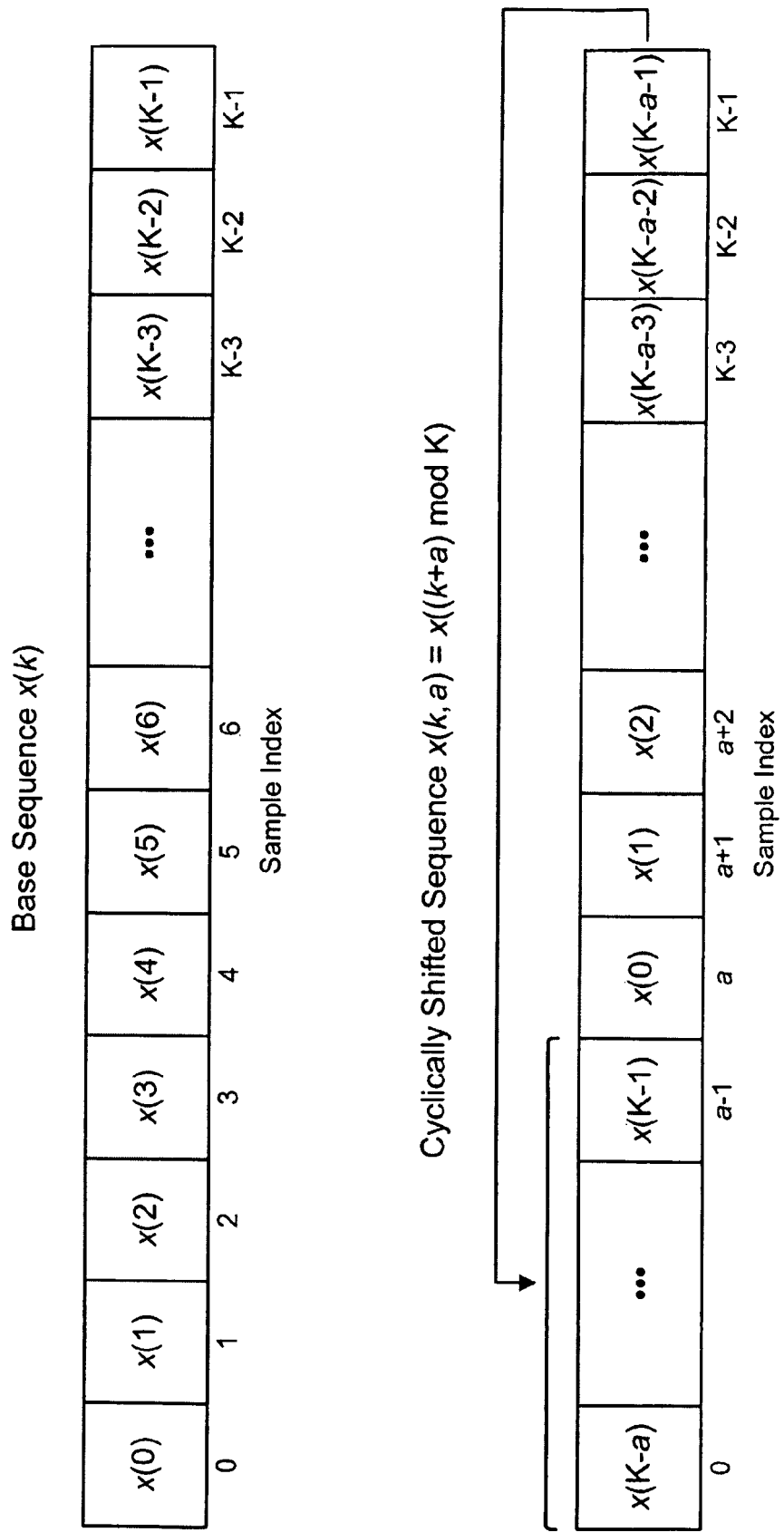
FIG. 4 shows a base sequence and a cyclically shifted sequence.

FIG. 4 shows the base sequence x(k) and the cyclically shifted sequence x(k, a). The base sequence x(k) is composed of K samples x(0) through x(K−1) for sample indices 0 through K−1, respectively. The cyclically shifted sequence x(k, a) is composed of the same K samples x(0) through x(K−1), which are cyclically shifted by a samples. Thus, the first K−a samples x(0) through x(K−a−1) are mapped to sample indices a through K−1, respectively, and the last a samples x(K−a) through x(K−1) are mapped to sample indices 0 through a−1, respectively. The last a samples of the base sequence x(k) are thus moved to the front of the cyclically shifted sequence x(k, a).

The amount of cyclic shift may vary over time based on a hopping pattern that indicates how much to cyclically shift the base sequence in each time interval. A time interval may be any time duration in which a given cyclic shift is applicable. For symbol rate hopping, the amount of cyclic shift may vary from symbol period to symbol period, and a in equation (2) may be a function of symbol period or index. For slot hopping, the amount of cyclic shift may vary from slot to slot, and a may be a function of slot index. In general, the hopping may be over a time interval of any duration, e.g., a symbol period, multiple symbol periods, a slot, a subframe, etc. For clarity, much of the description below is for symbol rate hopping, and the cyclically shifted sequence may be expressed as:

$$x(k,a_i(n))=x((k+a_i(n)) \bmod K), \text{ for } k=0, \ldots, K-1, \quad \text{Eq (3)}$$

where $a_i(n)$ is the amount of cyclic shift for user i in symbol period n, and
x(k, $a_i(n)$) is a cyclically shifted sequence for user i in symbol period n.

In one design, the cyclically shifted sequence may be modulated with information as follows:

$$y_i(k,n)=s_i(n) \cdot x(k,a_i(n)), \quad \text{Eq (4)}$$

where $s_i(n)$ is a modulation symbol to be sent by user i in symbol period n, and
$y_i(k,n)$) is a modulated sequence for user i in symbol period n.

In the design shown in equation (4), each sample of the cyclically shifted sequence is multiplied with modulation symbol $s_i(n)$, which may be a real or complex value. For example, $s_i(n)$ may be a modulation symbol for binary phase shift keying (BPSK), quadrature phase shift keying (QPSK), quadrature amplitude modulation (QAM), etc.

Figure 5:
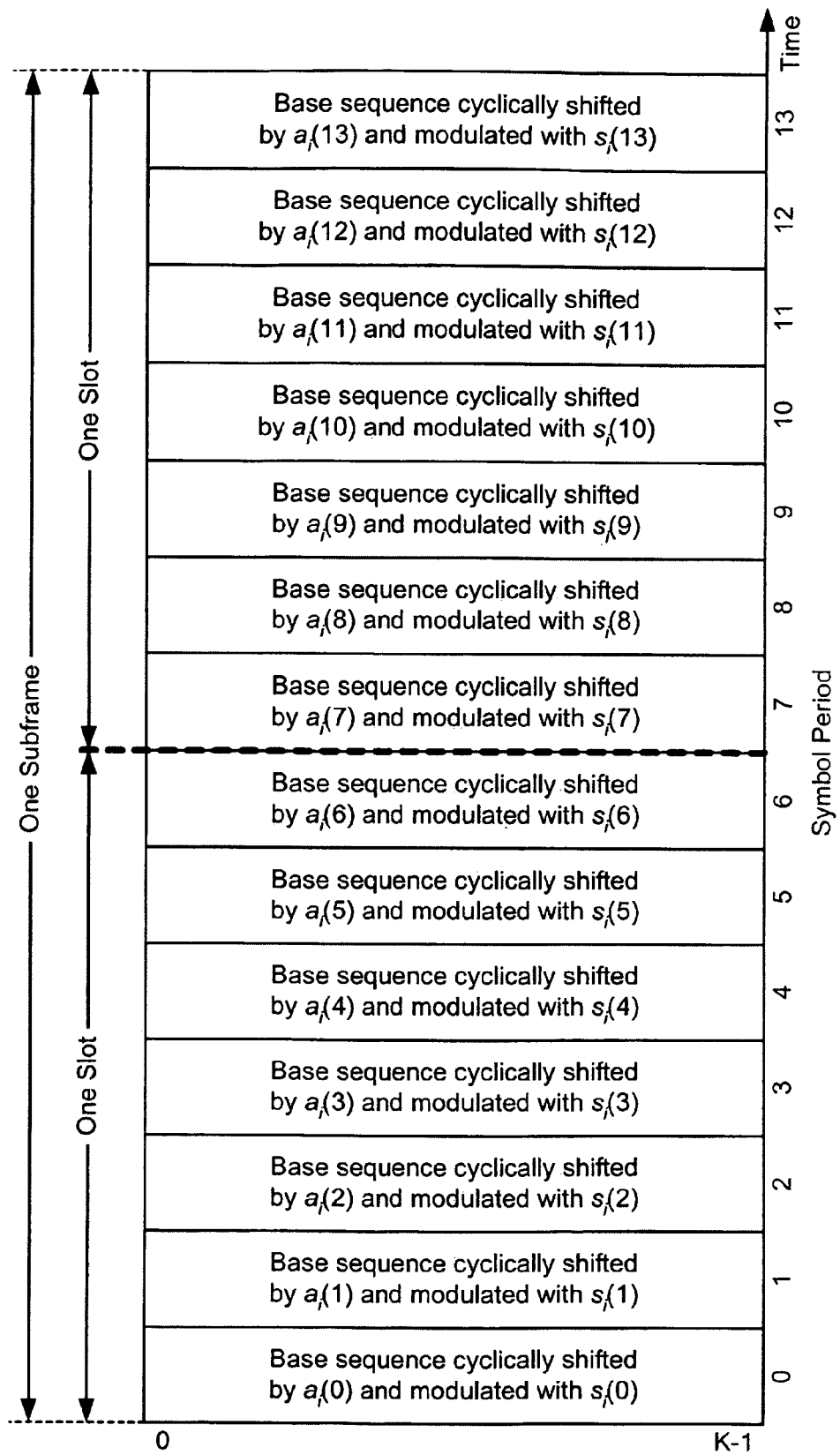
FIG. 5 shows transmission of information using cyclically shifted sequences.

FIG. 5 shows a design of transmitting information using cyclically shifted sequences. In this example, each slot includes 7 symbol periods, and a subframe includes 14 symbol periods with indices of 0 through 13. In each symbol period n, a cyclically shifted sequence x(k,$a_i(n)$) may be obtained based on the cyclic shift $a_i(n)$ for that symbol period, as shown in equation (3), and may be modulated with a modulation symbol $s_i(n)$, as shown in equation (4), to obtain a modulated sequence $y_i(k,n)$ containing K symbols. The K symbols may be sent on K consecutive subcarriers using LFDM, which is one variant of SC-FDM. Transmitting on contiguous subcarriers may result in a lower peak-to-average ratio (FAR), which is desirable. Different cyclically shifted sequences may be used in different symbol periods and may be obtained with different cyclic shifts $a_i(n)$. Different modulation symbols $s_i(n)$ may be sent on different cyclically shifted sequences in different symbol periods. The K subcarriers for the first slot may be different than the K subcarriers for the second slot, e.g., as shown in FIG. 3 but not shown in FIG. 5 for simplicity.

Sequence hopping with different cyclically shifted sequences may randomize interference from other users in adjacent cells. This randomization of adjacent cell interference may be beneficial for control channels such as ACK channel. Sequence hopping may provide the only viable mechanism for interference randomization if the cyclically shifted sequences are not scrambled with cell-specific scrambling sequences.

In one design, M different cyclic shifts may be defined for the base sequence and may be assigned indices of 0 through M−1. Cyclic shift $a_i(n)$ for user i in symbol period n may be selected from among the M possible cyclic shifts based on a hopping pattern. In each symbol period, up to M different users may simultaneously send information using M cyclically shifted sequences generated with M different cyclic shifts. The information from these users can be recovered since the M cyclically shifted sequences have zero cross-correlation (ideally).

In one design, the hopping pattern for user i may be a predetermined pattern. For example, the predetermined pattern may increment $a_i(n)$ by a fixed amount v in each symbol period and may be given as $a_i(n+1)=(a_i(n)+v) \bmod M$. In another design, the hopping pattern for user i may be a pseudo-random pattern that may select a pseudo-random value for $a_i(n)$ in each symbol period.

In one design, M different hopping patterns may be defined based on M different cyclic shifts of a base hopping pattern, as follows:

$$a_i(n)=(a(n)+i) \bmod M, \text{ for } i \in \{0, \ldots, M-1\}, \quad \text{Eq (5)}$$

where a(n) is the base hopping pattern. The base hopping pattern may be a predetermined pattern or a pseudo-random pattern and may be known to all users. Each user may determine its hopping pattern based on its index i and the base hopping pattern.

In another design, M different hopping patterns may be defined based on a cell-specific hopping pattern, as follows:

$$a_i(n)=h_j((i+n) \bmod M), \text{ for } i \in \{0, \ldots, M-1\}, \quad \text{Eq (6)}$$

where $h_j( )$ is a cell-specific hopping pattern for cell j. The cell-specific hopping pattern may be a predetermined pattern or a pseudo-random pattern and may be known to all users in the cell. Each user may determine its hopping pattern based on its index i and the cell-specific hopping pattern. Different cells may use different cell-specific hopping patterns, which may ensure randomization of adjacent cell interference.

In the designs shown in equations (5) and (6), M different hopping patterns may be defined for M different values of i. These M hopping patterns may be orthogonal to one another so that no two users use the same cyclic shift in any symbol period. The M different hopping patterns may be assigned to M different users for transmission of information on the same uplink resource block.

In the design shown in FIG. 3, S resource block pairs may be available for the downlink in each subframe and may be assigned to up to S users. If up to M users can share the same uplink resource block pair, then the number of uplink resource block pairs for the control section may be given as:

$$L \le \left\lceil \frac{S}{M} \right\rceil, \qquad \text{Eq (7)}$$

where L is the number of uplink resource block pairs for the control segment, and "⌈ ⌉" denotes a ceiling operator.

Each downlink resource block pair may be mapped to a corresponding uplink resource block pair, as follows:

$$s = l \cdot M + m, \qquad \text{Eq (8)}$$

where $s \in \{0, \ldots, S-1\}$ is an index for a downlink resource block pair, $l = 0, \ldots, L-1$ is an index for an uplink resource block pair, and $n = 0, \ldots, M-1$ is an index for a hopping pattern in an uplink resource block pair.

M different hopping patterns may be available for each uplink resource block pair and may select M different cyclic shifts in each symbol period.

Each user may be assigned one downlink resource block pair, and M users may share one uplink resource block pair. For the design in equation (8), a first set of M users may be assigned uplink resource block pair 0, a second set of M users may be assigned uplink resource block pair 1, etc. Different sets of users may be assigned different uplink resource block pairs through frequency division multiplexing (FDM). Up to M users in each set may share the same uplink resource block pair through code division multiplexing (CDM). A user may be assigned downlink resource block pair s and may also be assigned hopping pattern m for uplink resource block pair l, where s may be related to l and m as shown in equation (8). In particular, l may be given as $l = \lfloor s/M \rfloor$, and m may be given as $m = s \bmod M$, where "⌊ ⌋" denotes a floor operator. $a_i(n)$ may be equal to m at a designed symbol period.

Equation (8) shows one design of mapping S downlink resource block pairs to L uplink resource block pairs and M hopping patterns. The users may be assigned downlink resource block pairs, uplink resource block pairs, and hopping patterns in other manners. In general, a user may be assigned any number of downlink resource block pairs, any number of uplink resource block pairs, and any number of hopping patterns depending on various factors such as the available resources, data requirements of the user, etc. For example, a user may be assigned multiple downlink resource block pairs but only one hopping pattern for one uplink resource block pair.

As shown in FIG. 2, a user may send only ACK, or only CQI, or both ACK and CQI on the uplink in a given subframe. The user may be assigned an uplink resource block pair and a hopping pattern for sending ACK and/or CQI, e.g., as described above. The user may send ACK and/or CQI on the assigned uplink resource block pair in various manners.

Figure 6A:
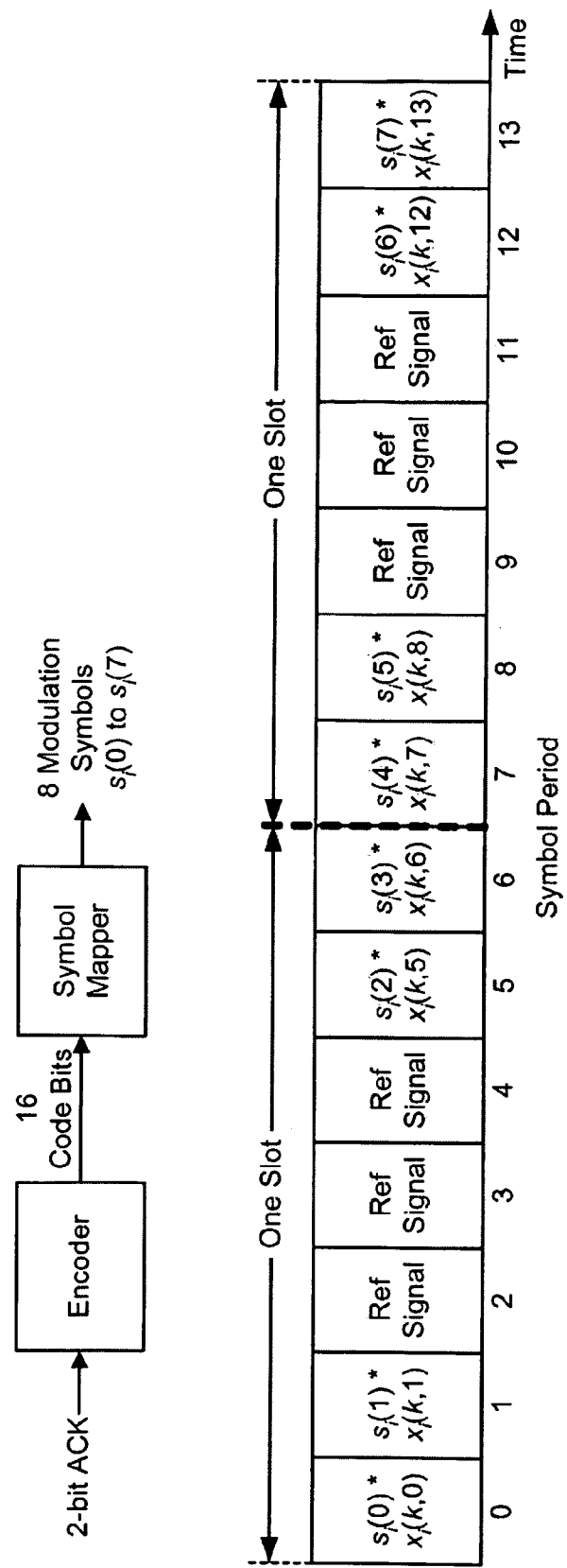
FIGS. 6A and 6B show transmission of ACK and/or CQI.

FIG. 6A shows a design of transmitting ACK using cyclically shifted sequences. In this design, the ACK may comprise 2 bits for acknowledgement of one or two packets. The 2 bits for the ACK may be encoded to obtain 16 code bits, which may be mapped to 8 QPSK modulation symbols $s_i(0)$ through $s_i(7)$. Each modulation symbol may be sent with one cyclically shifted sequence, which may be denoted as $x_i(k, n) = x(k, a_i(n)) = x((k + a_i(n)) \bmod K)$.

In the design shown in FIG. 6A, the first two modulation symbols $s_i(0)$ and $s_i(1)$ may be sent with two cyclically shifted sequences $x_i(k,0)$ and $x_i(k,1)$ in symbol periods 0 and 1, respectively. Reference signals may be sent in symbol periods 2, 3 and 4. The next four modulation symbols $s_i(2)$ through $s_i(5)$ may be sent with four cyclically shifted sequences $x_i(k,5)$ through $x_i(k,8)$ in symbol periods 5 through 8, respectively. Reference signals may be sent in symbol periods 9, 10 and 11. The last two modulation symbols $s_i(6)$ and $s_i(7)$ may be sent with two cyclically shifted sequences $x_i(k,12)$ and $x_i(k,13)$ in symbol periods 12 and 13, respectively.

In one design, the reference signal for each symbol period may be an unmodulated cyclically shifted sequence for that symbol period. In this design, the reference signals for symbol periods 2 through 4 may be three cyclically shifted sequences $x_i(k,2)$ through $x_i(k,4)$, respectively, and the reference signals for symbol periods 9 through 11 may be three cyclically shifted sequences $x_i(k,9)$ through $x_i(k,11)$, respectively. The reference signals may also be generated in other manners.

Figure 6B:
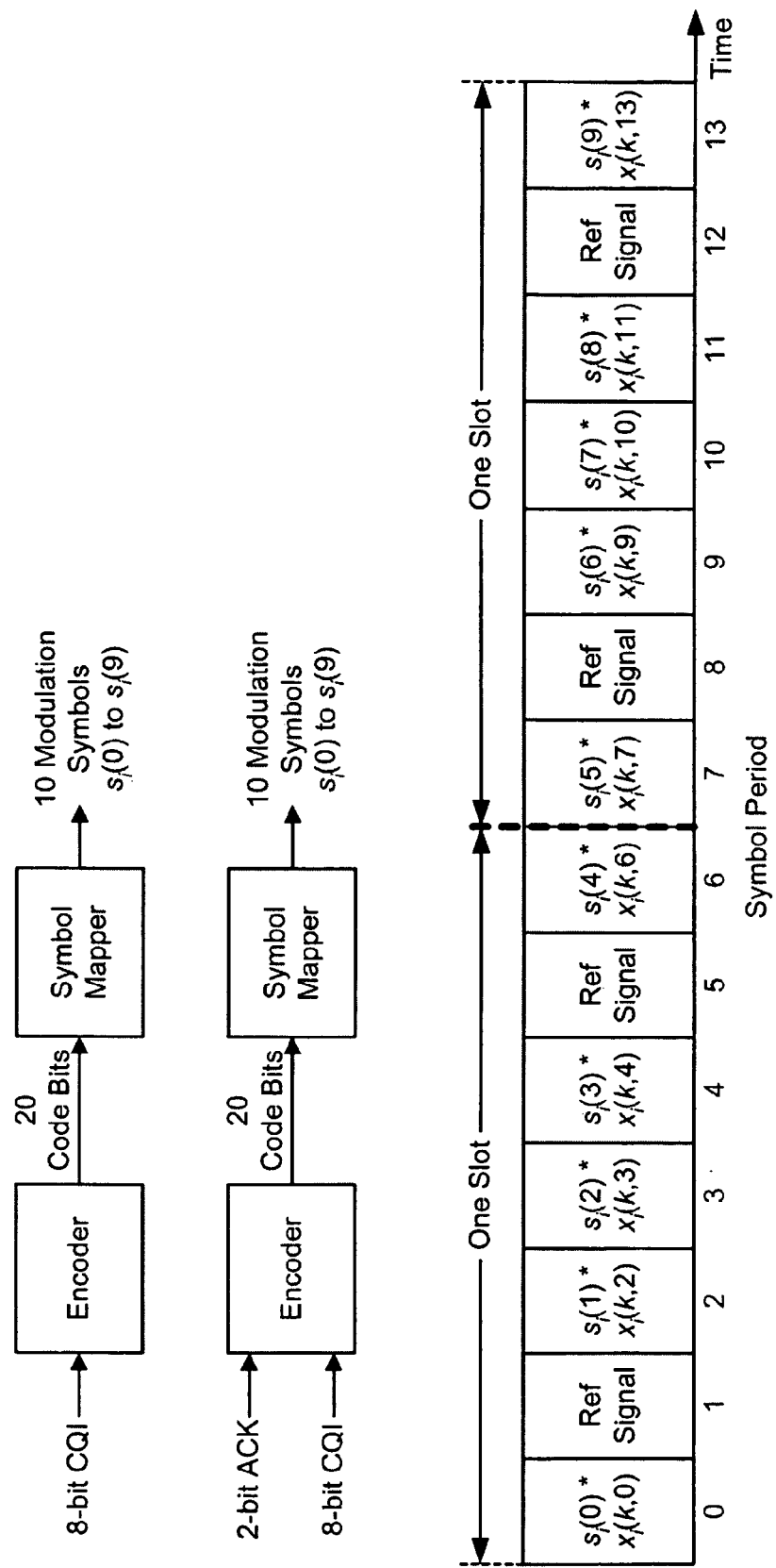

FIG. 6B shows a design of transmitting CQI or both ACK and CQI using cyclically shifted sequences. The CQI may comprise (i) a base CQI value and a differential CQI value for multiple packets or (ii) one or more CQI values for one or more packets. In one design, the CQI may comprise 8 bits, and the ACK may comprise 2 bits. If only CQI is sent, then the 8 bits for the CQI may be encoded with a (20, 8) block code to obtain 20 code bits, which may be mapped to 10 QPSK modulation symbols $s_i(0)$ through $s_i(9)$. If both ACK and CQI are sent, then the 10 bits for the ACK and CQI may be encoded with a (20, 10) block code to obtain 20 code bits, which may be mapped to 10 QPSK modulation symbols $s_i(0)$ through $s_i(9)$. In this design, the number of information bits changes depending on whether only CQI or both ACK and CQI are sent, but the number of modulation symbols remains the same. Each modulation symbol may be sent with one cyclically shifted sequence.

In the design shown in FIG. 6B, the first modulation symbol $s_i(0)$ may be sent with one cyclically shifted sequence $x_i(k,0)$ in symbol period 0. A reference signal may be sent in symbol period 1. The next three modulation symbols $s_i(1)$ through $s_i(3)$ may be sent with three cyclically shifted sequences $x_i(k,2)$ through $x_i(k,4)$ in symbol periods 2 through 4, respectively. A reference signal may be sent in symbol period 5. The next two modulation symbols $s_i(4)$ and $s_i(5)$ may be sent with two cyclically shifted sequences $x_i(k,6)$ and $x_i(k,7)$ in symbol periods 6 and 7, respectively. A reference signal may be sent in symbol period 8. The next three modulation symbols $s_i(6)$ through $s_i(8)$ may be sent with three cyclically shifted sequences $x_i(k,9)$ through $x_i(k,11)$ in symbol periods 9 through 11, respectively. A reference signal may be sent in symbol period 12. The last modulation symbol $s_i(9)$ may be sent with one cyclically shifted sequence $x_i(k,13)$ in symbol period 13. The reference signal for each symbol period may be an unmodulated cyclically shifted sequence for that symbol period. The reference signals for symbol periods 1, 5, 8 and 12 may be four cyclically shifted sequences $x_i(k,1)$, $x_i(k,5)$, $x_i(k,8)$ and $x_i(k,12)$, respectively.

The modulated sequences for only ACK, or only CQI, or both ACK and CQI may be transmitted at different power levels, e.g., different offsets relative to the reference signal level. The power levels may be selected to achieve the desired reliability for the ACK and/or CQI transmission.

FIGS. 6A and 6B show specific designs of transmitting ACK and/or CQI in an uplink resource block pair comprising 14 symbol periods. The ACK and/or CQI may also be encoded and mapped to modulation symbols in other manners. The modulation symbols and reference signals may also be sent in symbol periods different from the ones shown in FIGS. 6A and 6B.

In general, information may be encoded and mapped to any number of modulation symbols, and each modulation may be sent using a cyclically shifted sequence in a symbol period. For clarity, much of the description above is for symbol rate hopping, and different cyclically shifted sequences are used in different symbol periods. The sequence hopping may also be at a slower rate. In this case, the same cyclically shifted sequence may be used in multiple symbol periods, and multiple modulation symbols may be sent using the same cyclically shifted sequence.

Figure 7:
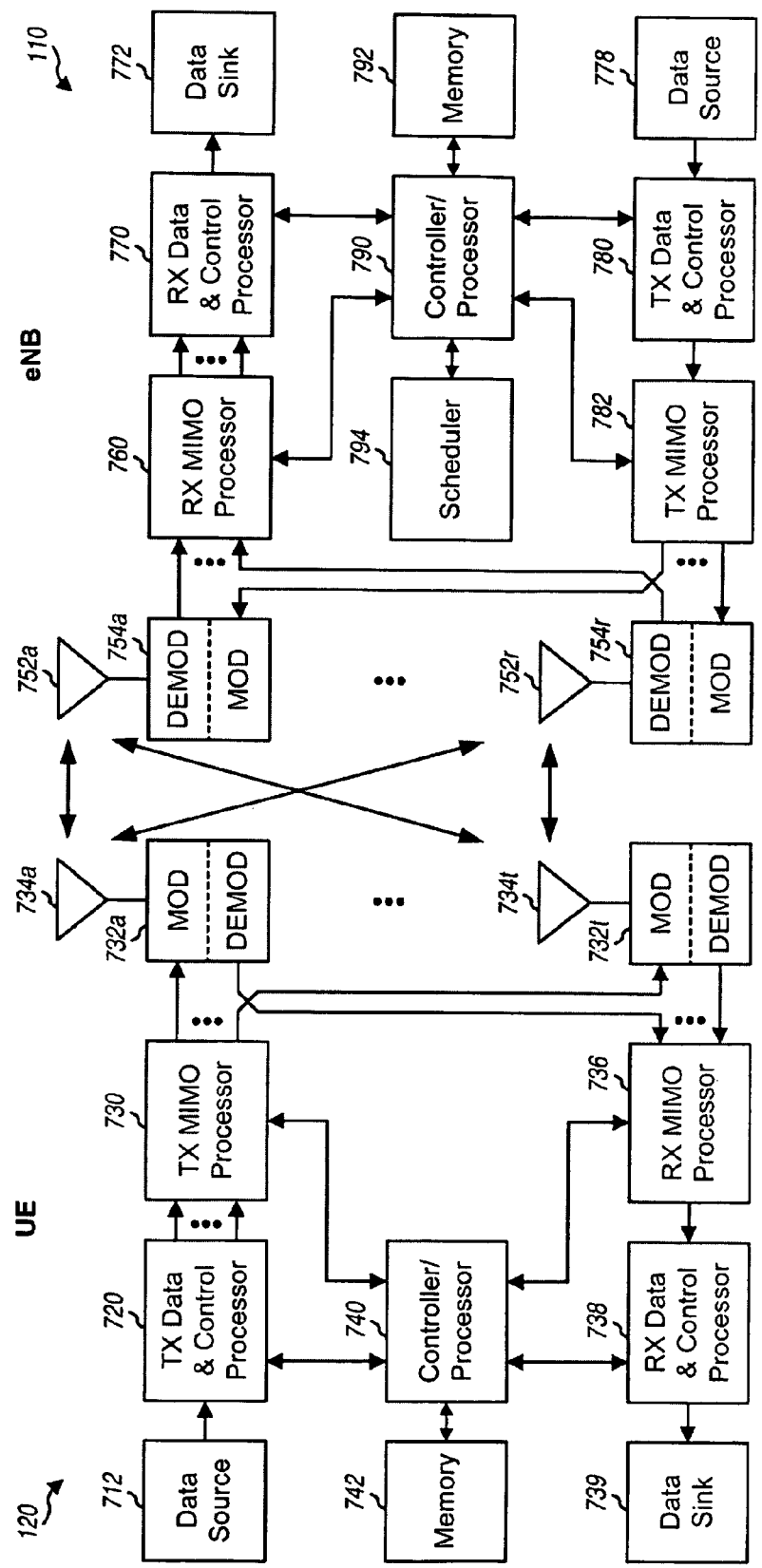
FIG. 7 shows a block diagram of an eNB and a UE.

FIG. 7 shows a block diagram of a design of eNB 110 and UE 120, which are one of the eNBs and one of the UEs in FIG. 1. In this design, UE 120 is equipped with T antennas 734a through 734t, and eNB 110 is equipped with R antennas 752a through 752r, where in general T≥1 and R≥1.

At UE 120, a TX data and control processor 720 may receive traffic data from a data source 712, process (e.g., encode, interleave, scramble, and symbol map) the traffic data, and provide data symbols. Processor 720 may also receive control information from a controller/processor 740, process the control information as described above, and provide control symbols, e.g., for modulated sequences. The control information may comprise ACK, CQI, etc. Processor 720 may also generate and multiplex pilot symbols with the data and control symbols. A data symbol is a symbol for data, a control symbol is a symbol for control information, a pilot symbol is a symbol for pilot, and a symbol may be a real or complex value. The data, control and/or pilot symbols may be modulation symbols from a modulation scheme such as PSK or QAM. Pilot is data that is known a priori by both the eNB and the UE.

A TX MIMO processor 730 may process (e.g., precode) the symbols from processor 720 and provide T output symbol streams to T modulators (MOD) 732a through 732t. TX MIMO processor 730 may be omitted if UE 120 is equipped with a single antenna. Each modulator 732 may process its output symbol stream (e.g., for SC-FDM) to obtain an output chip stream. Each modulator 732 may further condition (e.g., convert to analog, filter, amplify, and upconvert) its output chip stream to generate an uplink signal. T uplink signals from modulators 732a through 732t may be transmitted via T antennas 734a through 734t, respectively.

At eNB 110, antennas 752a through 752r may receive the uplink signals from UE 120 and/or other UEs. Each antenna 752 may provide a received signal to a respective demodulator (DEMOD) 754. Each demodulator 754 may condition (e.g., filter, amplify, downconvert, and digitize) its received signal to obtain samples and may further process the samples (e.g., for SC-FDM) to obtain demodulated symbols. An RX MIMO processor 760 may perform MIMO detection on the demodulated symbols from all R demodulators 754a through 754r and provide detected symbols. An RX data and control processor 770 may process (e.g., demodulate, deinterleave, descramble, and decode) the detected symbols, provide decoded data to a data sink 772, and provide decoded control information to a controller/processor 790. In general, the processing by processors 760 and 770 is complementary to the processing by processors 730 and 720, respectively, at UE 120.

eNB 110 may transmit traffic data and/or control information on the downlink to UE 120. Traffic data from a data source 778 and/or control information from controller/processor 790 may be processed by a TX data and control processor 780 and further processed by a TX MIMO processor 782 to obtain R output symbol streams. R modulators 754a through 754r may process the R output symbol streams (e.g., for OFDM) to obtain R output chip streams and may further condition the output chip streams to obtain R downlink signals, which may be transmitted via R antennas 752a through 752r. At UE 120, the uplink signals from eNB 110 may be received by antennas 734a through 734t, conditioned and processed by demodulators 732a through 732t, and further processed by an RX MIMO processor 736 (if applicable) and an RX data and control processor 738 to recover the traffic data and control information sent to UE 120.

Controllers/processors 740 and 790 may direct the operation at UE 120 and eNB 110, respectively. Memories 742 and 792 may store data and program codes for UE 120 and eNB 110, respectively. A scheduler 794 may schedule UEs for data transmission on the downlink and/or uplink and may assign resources to the scheduled UEs.

Figure 8:
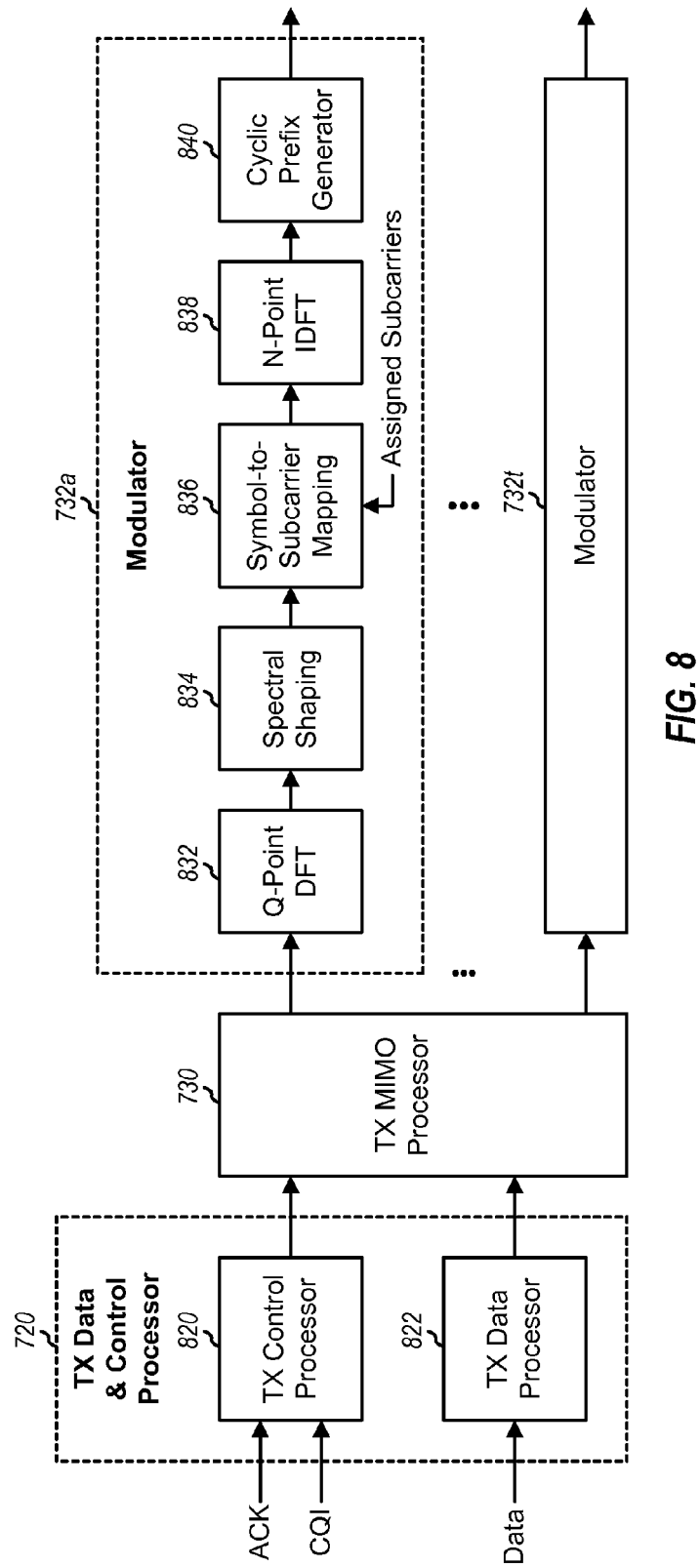
FIG. 8 shows a transmit (TX) data and control processor and a modulator.

FIG. 8 shows a block diagram of a design of TX data and control processor 720 and modulator 732a at UE 120 in FIG. 7. Within processor 720, a TX control processor 820 may receive and process control information, e.g., ACK and/or CQI, as shown in FIGS. 6A and 6B. Processor 820 may generate cyclically shifted sequences based on a hopping pattern assigned to UE 120 and may modulate these cyclically shifted sequences with modulation symbols for the control information to obtain modulated sequences. A TX data processor 822 may process traffic data and provide data symbols. TX MIMO processor 730 may receive, multiplex, and spatially process the symbols from processors 820 and 822 and provide T output symbol streams to T modulators.

Each modulator 732 may perform SC-FDM on its stream of output symbols. Within modulator 732a, a discrete Fourier transform (DFT) unit 832 may receive Q output symbols in each symbol period, where Q is the number of subcarriers to use for transmission. Q may be equal to K and correspond to the number of subcarriers in an assigned uplink resource block pair if only control information and no data is being sent. Unit 832 may perform a Q-point DFT on the Q output symbols and provide Q frequency-domain symbols. A spectral shaping unit 834 may perform spectral shaping on the Q frequency-domain symbols and provide Q spectrally shaped symbols. A symbol-to-subcarrier mapping unit 836 may map the Q spectrally shaped symbols to Q subcarriers used for transmission and may map zero symbols to the remaining subcarriers. An inverse DFF (IDFT) unit 838 may perform an N-point IDFT on the N mapped symbols for the N total subcarriers and provide N time-domain chips for a useful portion. A cyclic prefix generator 840 may copy the last C chips of the useful portion and append these C chips to the front of the useful portion to form an SC-FDM symbol containing N+C chips. The SC-FDM symbol may be sent in one symbol period, which may be equal to N+C chip periods.

Figure 9:
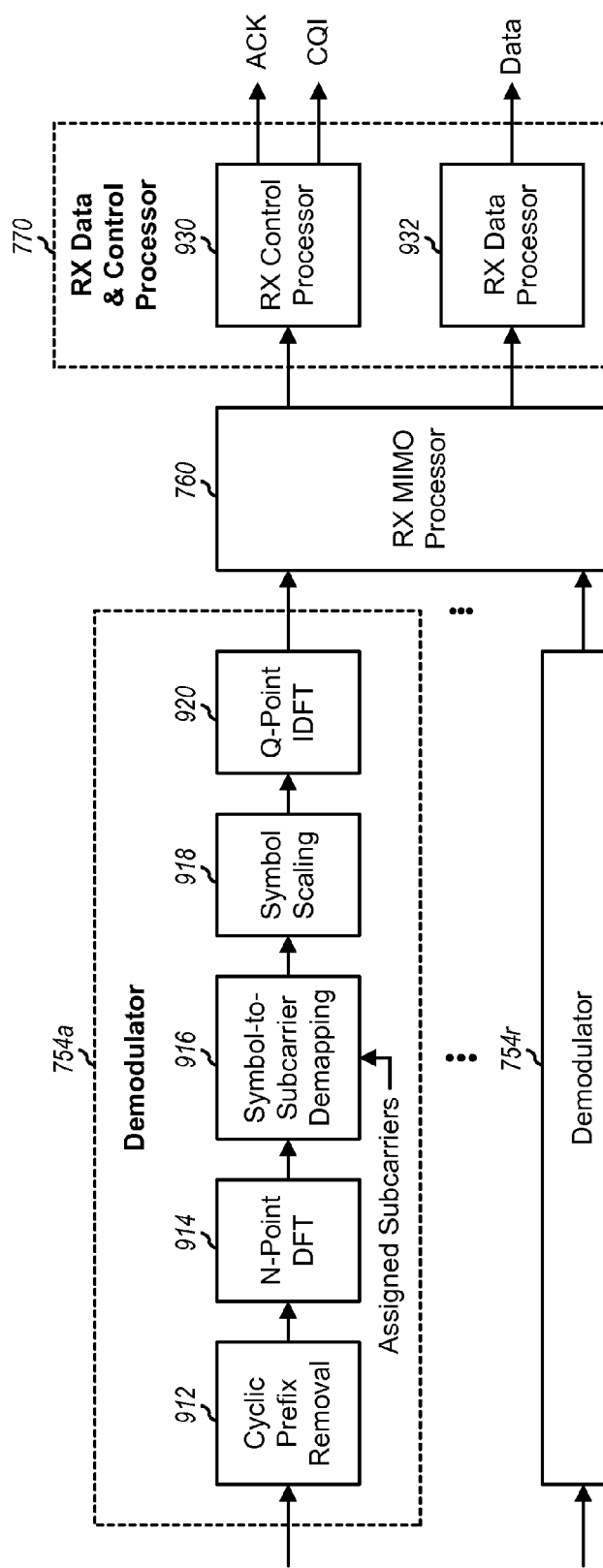
FIG. 9 shows a demodulator and a receive (RX) data and control processor.

FIG. 9 shows a block diagram of a design of demodulator 754a and RX data and control processor 770 at eNB 110 in FIG. 7. Within demodulator 754a, a cyclic prefix removal unit 912 may obtain N+C received samples in each symbol period, remove C received samples corresponding to the cyclic prefix, and provide N received samples for the useful portion. A DFT unit 914 may perform an N-point DFT on the N received samples and provide N received symbols for the N total subcarriers. These N received symbols may contain data and control information from all UEs transmitting to eNB 110. The processing to recover control information from UE 120 is described below.

A symbol-to-subcarrier demapping unit 916 may provide Q received symbols from the Q subcarriers used by UE 120 and may discard the remaining received symbols. A scaling unit 918 may scale the Q received symbols based on the spectral shaping performed by UE 120. An IDFT unit 920 may perform a Q-point IDFT on the Q scaled symbols and provide Q demodulated symbols. RX MIMO processor 760 may perform MIMO detection on the demodulated symbols from all R demodulators 754a through 754r, provide detected symbols for control information to an RX control processor 930, and provide detected symbols for data to an RX data processor 932. RX control processor 930 may process its detected symbols and provide decoded control information, e.g., ACK and/or CQI. Processor 930 may correlate the detected symbols with the appropriate cyclically shifted sequences, compare the correlation results against one or more thresholds, and obtain decoded control information based on the comparison results. RX data processor 932 may process its detected symbols and provide decoded data.

Figures 10, 11:
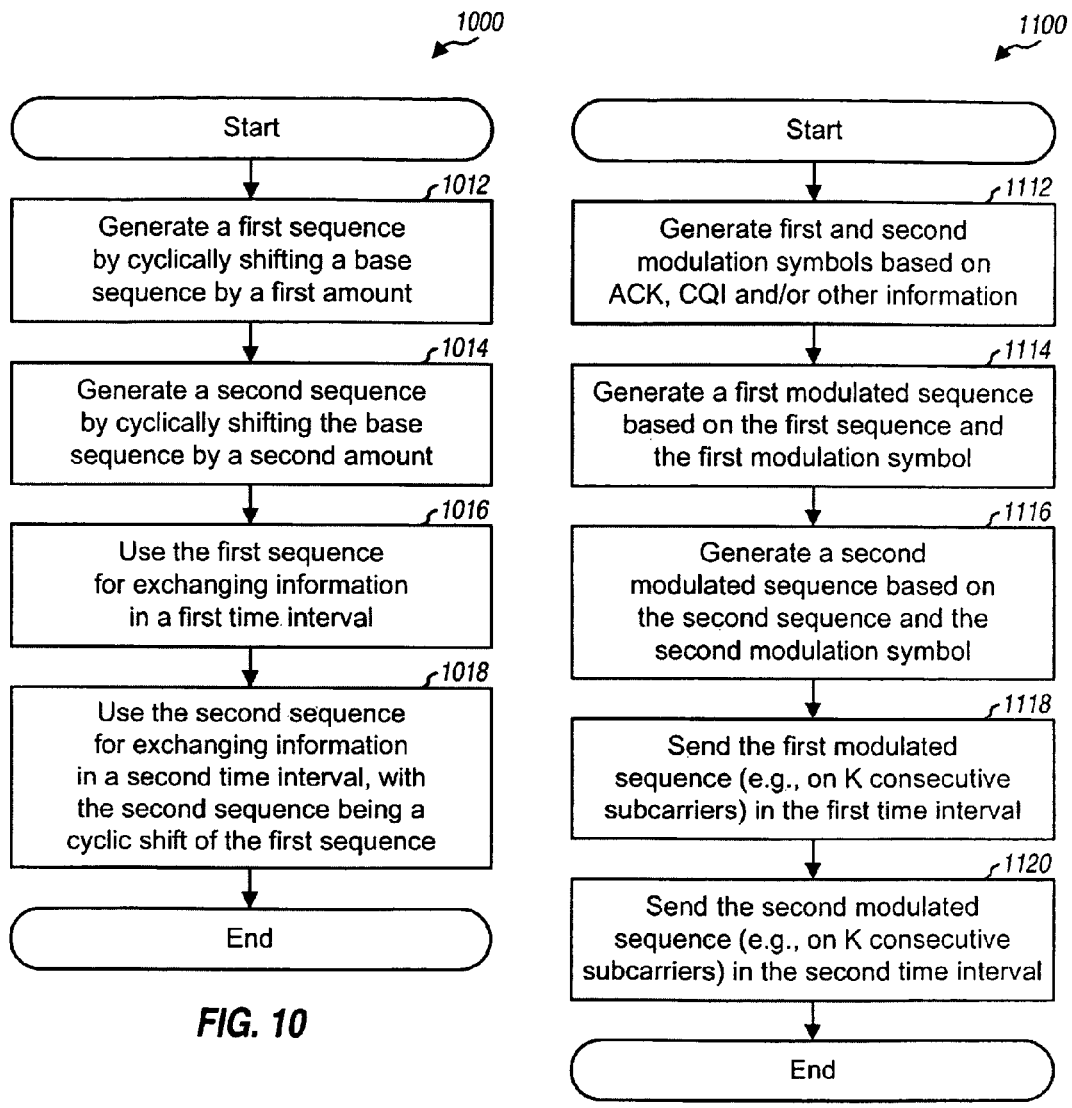
FIG. 10 shows a process for exchanging information.
FIG. 11 shows a process for sending information.

FIG. 10 shows a design of a process 1000 for exchanging information in a wireless communication system. Process 1000 may be performed by a UE, a base station (e.g., an eNB), or some other entity. A first sequence may be generated by cyclically shifting a base sequence by a first amount (block 1012). A second sequence may be generated by cyclically shifting the base sequence by a second amount (block 1014). The base sequence may be a CAZAC sequence, a PN sequence, or some other sequence having good correlation properties. The cyclic shifts for the first and second sequences may be determined based on a hopping pattern. The hopping pattern may be specific to a cell and may be determined based on resources assigned for data transmission.

The first sequence may be used for exchanging (e.g., sending or receiving) information in a first time interval (block 1016). The second sequence may be used for exchanging information in a second time interval, with the second sequence being a cyclic shift of the first sequence (block 1018). A third sequence may be used for a reference signal in a third time interval, with the third sequence being another cyclic shift of the first sequence. The first or second sequence may also be used for the reference signal. The first and second time intervals may correspond to different symbol periods, different slots of multiple symbol periods, different subframes, etc.

FIG. 11 shows a design of a process 1100 performed by a transmitter, e.g., a UE, for sending information. Process 1100 is one design of blocks 1016 and 1018 in FIG. 10. First and second modulation symbols may be generated based on ACK, CQI, and/or other information (block 1112). A first modulated sequence may be generated based on the first sequence and the first modulation symbol (block 1114). A second modulated sequence may be generated based on the second sequence and the second modulation symbol (block 1116). For block 1114, each of K samples for the first sequence may be multiplied with the first modulation symbol to obtain a corresponding one of K symbols for the first modulated sequence. Similar processing may be performed for the second modulated sequence.

The first modulated sequence may be sent in the first time interval, e.g., by sending the K symbols for the first modulated sequence on K consecutive subcarriers in the first time interval (block 1118). The second modulated sequence may be sent in the second time interval, e.g., by sending the K symbols for the second modulated sequence on K consecutive subcarriers in the second time interval (block 1120).

FIG. 12 shows a design of a process 1200 performed by a receiver, e.g., an eNB, for receiving information. Process 1200 is another design of blocks 1016 and 1018 in FIG. 10. The first modulated sequence may be received (e.g., on K consecutive subcarriers) in the first time interval (block 1212). The second modulated sequence may be received (e.g., on K consecutive subcarriers) in the second time interval (block 1214). The first modulated sequence may be correlated with the first sequence to obtain information sent in the first time interval (block 1216). The second modulated sequence may be correlated with the second sequence to obtain information sent in the second time interval (block 1218).

The eNB may assign M hopping patterns to M UEs, with the M hopping patterns being associated with M different cyclic shifts of the base sequence in each time interval. In each time interval, the eNB may receive information sent simultaneously by the M UEs using M sequences of different cyclic shifts.

FIG. 13 shows a design of an apparatus 1300 for exchanging data in a wireless communication system. Apparatus 1300 includes means for generating a first sequence by cyclically shifting a base sequence by a first amount (block 1012), means for generating a second sequence by cyclically shifting the base sequence by a second amount (block 1014), means for using the first sequence for exchanging information in a first time interval (block 1016), and means for using the second sequence for exchanging information in a second time interval, with the second sequence being a cyclic shift of the first sequence (block 1018). The modules in FIG. 13 may comprise processors, electronics devices, hardware devices, electronics components, logical circuits, memories, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising: at least one processor configured to:
determine a plurality of cyclically shifted sequences to use for exchanging a first set of modulation symbols for control information in a first time slot by a user equipment (UE), each of the plurality of cyclically shifted sequences comprising K samples and being generated by cyclically shifting a base sequence by a respective amount, wherein the respective amounts are based at least in part on a cell-specific pattern and an index associated with the UE, and wherein K is an integer number greater than one and corresponds to a number of subcarriers used for exchanging the first set of modulation symbols in the first time slot,
generate a plurality of modulated sequences for the first time slot, wherein K symbols for each modulated sequence of the plurality of modulated sequences are generated by multiplying the K samples of a respective cyclically shifted sequence of the plurality of cyclically shifted sequences with a modulation symbol of the first set of modulation symbols; and
send, for a plurality of time intervals of the first time slot, the K symbols of a respective one of the plurality of modulated sequences on K consecutive subcarriers.

2. The apparatus of claim 1, wherein the base sequence is a CAZAC (constant amplitude zero auto correlation) sequence.

3. The apparatus of claim 1, wherein the at least one processor is configured to generate the first set of modulation symbols for the control information based on acknowledgement (ACK) information, or only channel quality indicator (CQI) information, or both ACK and CQI information.

4. The apparatus of claim 1, wherein the at least one processor is configured to determine respective amounts for cyclically shifting base sequence based on a hopping pattern.

5. The apparatus of claim 4, wherein the at least one processor is configured to determine the hopping pattern based on resources assigned for data transmission.

6. The apparatus of claim 4, wherein the hopping pattern is specific to a cell via which the control information is exchanged.

7. The apparatus of claim 1, wherein the plurality of time intervals correspond to a plurality of symbol periods of the first time slot.

8. The apparatus of claim 1, wherein the at least one processor is configured to generate a reference signal for transmission in at least one time interval of the plurality of time intervals of the first time slot based on an unmodulated cyclically shifted sequence of the base sequence.

9. The apparatus of claim 1, wherein the at least one processor is configured to send the plurality of modulated sequences on a first set of subcarriers comprising the K consecutive subcarriers in the first time slot, and to send a second plurality of modulated sequences on a second set of subcarriers in a second time slot, and wherein the second plurality of modulated sequences are generated based on a second set of modulation symbols for the control information and a second plurality of cyclically shifted sequences.

10. The apparatus of claim 9, wherein the second set of subcarriers is different from the first set of subcarriers.

11. The apparatus of claim 9, wherein the first and second sets of subcarriers include an equal number of subcarriers corresponding to an integer number of resource blocks.

12. The apparatus of claim 1, wherein the at least one processor is configured to generate a plurality of single-carrier frequency division multiple access (SC-FDMA) symbols based on the plurality of modulated sequences.

13. The apparatus of claim 9, wherein the second set of modulation symbols is different from the first set of modulation symbols.

14. The apparatus of claim 1, wherein the base sequence comprises K samples.

15. The apparatus of claim 1, wherein the respective amounts for cyclically shifting the base sequence are determined further based on a slot index associated with the first time slot.

16. The apparatus of claim 1, wherein each of the first set of modulation symbols comprises a different portion of the control information.

17. An apparatus for wireless communication at a base station, comprising:
at least one processor configured to:
determine a plurality of cyclically shifted sequences to use for exchanging a first set of modulation symbols for control information with a user equipment (UE) in a first time slot, each of the plurality of cyclically shifted sequences comprising K samples and being generated by cyclically shifting a base sequence by a respective amount, wherein the respective amounts are based at least in part on a cell-specific pattern and an index associated with the UE, and wherein K is an integer number greater than one and corresponds to a number of subcarriers used for exchanging the first set of modulation symbols in the first time slot;
receive a plurality of modulated sequences in the first time slot, wherein each modulated sequence comprises K symbols generated by multiplying the K samples of a respective cyclically shifted sequence of the plurality of cyclically shifted sequences with a modulation symbol of the first set of modulation symbols; and
correlate each of the plurality of modulated sequences with a respective sequence of the plurality of cyclically shifted sequences to obtain the first set of modulation symbols for the control information.

18. The apparatus of claim 17, wherein the at least one processor is configured to receive information sent simultaneously by M UEs using M pluralities of cyclically shifted sequences of different cyclic shifts in the first time slot, where M is an integer number of one or greater and corresponds to a number of hopping patterns assigned to UEs served by the base station, and the M pluralities of cyclically shifted sequences comprising the plurality of cyclically shifted sequences.

19. The apparatus of claim 17, wherein the at least one processor is configured to assign M hopping patterns to M UEs, where M is an integer number of one or greater, the M hopping patterns being associated with M different cyclic shifts of the base sequence in each of a plurality of time intervals of the first time slot.

20. A method for wireless communication, comprising:
determining a plurality of cyclically shifted sequences to use for exchanging a first set of modulation symbols for control information in a first time slot by a user equipment (UE), each of the plurality of cyclically shifted sequences comprising K samples and being generated by cyclically shifting a base sequence by a respective amount, wherein the respective amounts are based at least in part on a cell-specific pattern and an index associated with the UE, and wherein K is an integer number greater than one and corresponds to a number of subcarriers used for exchanging the first set of modulation symbols in the first time slot;
generating a plurality of modulated sequences for the first time slot, wherein K symbols for each modulated sequence of the plurality of modulated sequences are generated by multiplying the K samples of a respective cyclically shifted sequence of the plurality of cyclically shifted sequences with a modulation symbol of the first set of modulation symbols; and
sending, for a plurality of time intervals of the first time slot, the K symbols of a respective one of the plurality of modulated sequences on K consecutive subcarriers.

21. The method of claim 20, further comprising:
generating the first set of modulation symbols for the control information based on acknowledgement (ACK) information, or channel quality indicator (CQI) information, or both ACK and CQI information.

22. The method of claim 20, wherein the sending the plurality of modulated sequences comprises sending the plurality of modulated sequences on a first set of subcarriers comprising the K consecutive subcarriers in the first time slot, and wherein the method further comprises sending a second plurality of modulated sequences on a second set of subcarriers, wherein the second plurality of modulated sequences are generated based on a second set of modulation symbols for the control information and a second plurality of cyclically shifted sequences.

23. The method of claim 22, wherein the second set of subcarriers is different from the first set of subcarriers.

24. The method of claim 22, wherein the first and second sets of subcarriers include an equal number of subcarriers corresponding to an integer number of resource blocks.

25. The method of claim 20, further comprising:
generating a plurality of single-carrier frequency division multiple access (SC-FDMA) symbols based on the plurality of modulated sequences.

26. The method of claim 22, wherein the second set of modulation symbols is different from the first set of modulation symbols.

27. The method of claim 20, wherein the base sequence comprises K samples.

28. The method of claim 20, wherein the respective amounts for cyclically shifting the base sequence are determined further based on a slot index associated with the first time slot.

29. The method of claim 20, further comprising:
generating at least one reference signal for transmission in at least one time interval of the plurality of time intervals of the first time slot based on an unmodulated cyclically shifted sequence of the base sequence.

30. The method of claim 20, wherein each of the first set of modulation symbols comprises a different portion of the control information.

31. A method for wireless communication at a base station, comprising:
determining a plurality of cyclically shifted sequences to use for exchanging a first set of modulation symbols for control information with a user equipment (UE) in a first time slot, each of the plurality of cyclically shifted sequences comprising K samples and being generated by cyclically shifting a base sequence by a respective amount, wherein the respective amounts are based at least in part on a cell-specific pattern and an index associated with the UE, and wherein K is an integer number greater than one and corresponds to a number of subcarriers used for exchanging the first set of modulation symbols in the first time slot;
receiving a plurality of modulated sequences in the first time slot, wherein each modulated sequence comprises K symbols generated by multiplying the K samples of a respective cyclically shifted sequence of the plurality of cyclically shifted sequences with a modulation symbol of the first set of modulation symbols; and correlating each of the plurality of modulated sequences with a respective sequence of the plurality of cyclically shifted sequences to obtain the first set of modulation symbols for the control information.

32. The method of claim 31, further comprising:
receiving information sent simultaneously by M UEs with M pluralities of cyclically shifted sequences of different cyclic shifts in the first time slot, where M is an integer number of one or greater and corresponds to a number of hopping patterns assigned to UEs served by the base station, and the M pluralities of cyclically shifted sequences comprising the plurality of cyclically shifted sequences.

33. An apparatus for wireless communication, comprising:
means for determining a plurality of cyclically shifted sequences for exchanging a first set of modulation symbols for control information in a first time slot by a user equipment (UE), each of the plurality of cyclically shifted sequences comprising K samples and being generated by cyclically shifting a base sequence by a respective amount, wherein the respective amounts are based at least in part on a cell-specific pattern and an index associated with the UE, and wherein K is an integer number greater than one and corresponds to a number of subcarriers used for exchanging the first set of modulation symbols in the first time slot;
means for generating a plurality of modulated sequences for the first time slot, wherein K symbols for each modulated sequence of the plurality of modulated sequences are generated by multiplying the K samples of a respective cyclically shifted sequence of the plurality of cyclically shifted sequences with a modulation symbol of the first set of modulation symbols; and
means for sending, for a plurality of time intervals of the first time slot, the K symbols of a respective one of the plurality of modulated sequences on K consecutive subcarriers.

34. The apparatus of claim 33, wherein the first set of modulation symbols for the control information comprises acknowledgement (ACK) information, or channel quality indicator (CQI) information, or both ACK and CQI information.

35. The apparatus of claim 33, wherein the means for sending sends the plurality of modulated sequences on a first set of subcarriers comprising the K consecutive subcarriers in the first time slot, wherein the means for sending sends a second plurality of modulated sequences on a second set of subcarriers, and wherein the second plurality of modulated sequences are generated based on a second set of modulation symbols for the control information and a second plurality of cyclically shifted sequences.

36. The apparatus of claim 35, wherein the second set of subcarriers is different from the first set of subcarriers.

37. The apparatus of claim 35, wherein the first and second sets of subcarriers include an equal number of subcarriers corresponding to an integer number of resource blocks.

38. The apparatus of claim 33,
wherein the means for sending generates a plurality of single-carrier frequency division multiple access (SC-FDMA) symbols based on the plurality of modulated sequences.

39. The apparatus of claim 35, wherein the second set of modulation symbols is different from the first set of modulation symbols.

40. The apparatus of claim 33, wherein the base sequence comprises K samples.

41. The apparatus of claim 33, wherein the respective amounts for cyclically shifting the base sequence are determined further based on a slot index associated with the first time slot.

42. The apparatus of claim 33, further wherein the means for generating the plurality of modulated sequences generates at least one reference signal for transmission in at least one time interval of the plurality of time intervals of the first time slot based on an unmodulated cyclically shifted sequence of the base sequence.

43. The apparatus of claim 33, wherein each of the first set of modulation symbols comprises a different portion of the control information.

44. An apparatus for wireless communication at a base station, comprising:
means for determining a plurality of cyclically shifted sequences to use for exchanging a first set of modulation symbols for control information with a user equipment (UE) in a first time slot, each of the plurality of cyclically shifted sequences comprising K samples and being generated by cyclically shifting a base sequence by a respective amount, wherein the respective amounts are based at least in part on a cell-specific pattern and an index associated with the UE, and wherein K is an integer number greater than one and corresponds to a number of subcarriers used for exchanging the first set of modulation symbols in the first time slot;
means for receiving a plurality of modulated sequences in the first time slot, wherein each modulated sequence comprises K symbols generated by multiplying the K samples of a respective cyclically shifted sequence of the plurality of cyclically shifted sequences with a modulation symbol of the first set of modulation symbols; and
means for correlating each of the plurality of modulated sequences with a respective sequence of the plurality of cyclically shifted sequences to obtain the first set of modulation symbols for the control information.

45. The apparatus of claim 44,
wherein the means for receiving the plurality of modulated sequences receives information sent simultaneously by M UEs with M pluralities of cyclically shifted sequences of different cyclic shifts in the first time slot, where M is an integer number of one or greater and corresponds to a number of hopping patterns assigned to UEs served by the base station, and the M pluralities of cyclically shifted sequences comprising the plurality of cyclically shifted sequences.

46. A non-transitory machine-readable medium comprising instructions which, when executed by a machine, cause the machine to perform operations including:
determine a plurality of cyclically shifted sequences to use for exchanging a first set of modulation symbols for control information in a first time slot by a user equipment (UE), each of the plurality of cyclically shifted sequences comprising K samples and being generated by cyclically shifting a base sequence by a respective amount, wherein the respective amounts are based at least in part on a cell-specific pattern and an index associated with the UE, and wherein K is an integer number greater than one and corresponds to a number of subcarriers used for exchanging the first set of modulation symbols in the first time slot;
generating a plurality of modulated sequences for the first time slot, wherein K symbols for each modulated sequence of the plurality of modulated sequences are generated by multiplying the K samples of a respective cyclically shifted sequence of the plurality of cyclically shifted sequences with a modulation symbol of the first set of modulation symbols; and sending, for a plurality of time intervals of the first time slot, the K symbols of a respective one of the plurality of modulated sequences on K consecutive subcarriers.

47. A non-transitory machine-readable medium comprising instructions which, when executed by a machine, cause the machine to perform operations including:

determining a plurality of cyclically shifted sequences to use at a base station for exchanging a first set of modulation symbols for control information with a user equipment (UE) in a first time slot, each of the plurality of cyclically shifted sequences comprising K samples and being generated by cyclically shifting a base sequence by a respective amount, wherein the respective amounts are based at least in part on a cell-specific pattern and an index associated with the UE, and wherein K is an integer number greater than one and corresponds to a number of subcarriers used for exchanging the first set of modulation symbols in the first time slot;

receiving a plurality of modulated sequences in the first time slot, wherein each modulated sequence comprises K symbols generated by multiplying the K samples of a respective cyclically shifted sequence of the plurality of cyclically shifted sequences with a modulation symbol of the first set of modulation symbols;

correlating each of the plurality of modulated sequences with a respective sequence of the plurality of cyclically shifted sequences to obtain the first set of modulation symbols for the control information.

* * * * *